(12) United States Patent
Scholl et al.

(10) Patent No.: US 7,234,536 B2
(45) Date of Patent: Jun. 26, 2007

(54) POWER SCREWDRIVER

(75) Inventors: Thomas Scholl, Reutlingen (DE);
Oliver Greese, Filderstadt (DE)

(73) Assignee: C. & E. Fein GmbH (DE)

( * ) Notice: Subject to any disclaimer, the term of this patent is extended or adjusted under 35 U.S.C. 154(b) by 161 days.

(21) Appl. No.: 11/197,254

(22) Filed: Aug. 4, 2005

(65) Prior Publication Data

US 2006/0032648 A1    Feb. 16, 2006

(30) Foreign Application Priority Data

Aug. 4, 2004    (DE)    ................. 10 2004 038 829

(51) Int. Cl.
*B25B 23/14*    (2006.01)

(52) U.S. Cl. .............. 173/1; 173/2; 173/176; 173/178; 173/183

(58) Field of Classification Search ........ 173/1, 173/2, 176, 178, 179, 181, 183; 318/433, 318/463, 464, 611; 73/862.23
See application file for complete search history.

(56) References Cited

U.S. PATENT DOCUMENTS

| | | | | |
|---|---|---|---|---|
| 3,589,489 | A | | 6/1971 | Fehlings ............... 192/139 |
| 4,056,762 | A | | 11/1977 | Schadlich ............ 318/484 |
| 4,259,775 | A | * | 4/1981 | Eshghy ............... 29/407.02 |
| 5,186,262 | A | * | 2/1993 | Thompson ............ 173/182 |
| 5,631,823 | A | * | 5/1997 | Layer et al. ............ 700/50 |
| 6,173,792 | B1 | | 1/2001 | Hald ................... 173/178 |
| 6,353,297 | B1 | | 3/2002 | Meyer ................. 318/273 |
| 6,371,218 | B1 | * | 4/2002 | Amano et al. .......... 173/183 |
| 6,457,535 | B1 | * | 10/2002 | Tanaka ................ 173/48 |
| 6,687,567 | B2 | * | 2/2004 | Watanabe ............. 700/168 |
| 6,782,594 | B2 | * | 8/2004 | Shoberg ............ 29/407.03 |
| 6,923,268 | B2 | * | 8/2005 | Totsu .................. 173/2 |
| 6,954,682 | B2 | * | 10/2005 | Makimae et al. ....... 700/275 |
| 7,036,605 | B2 | * | 5/2006 | Suzuki et al. .......... 173/20 |
| 7,063,171 | B2 | * | 6/2006 | Totsu ................. 173/181 |
| 7,109,675 | B2 | * | 9/2006 | Matsunaga et al. ..... 318/433 |
| 2004/0130282 | A1 | | 7/2004 | Meyer et al. ........... 318/362 |

FOREIGN PATENT DOCUMENTS

| | | |
|---|---|---|
| DE | 1 603 791 | 4/1966 |
| DE | 1 944 797 U | 8/1966 |
| DE | 1 703 316 B | 5/1968 |
| DE | 22 13 549 A1 | 3/1972 |
| DE | 25 16 951 | 4/1975 |
| DE | 195 07 558 A1 | 3/1995 |
| DE | 196 09 986 A1 | 3/1996 |
| EP | 1 258 321 A2 | 11/2002 |

OTHER PUBLICATIONS

European Search Report, dated Oct. 4, 2005 (3 pages).

* cited by examiner

*Primary Examiner*—Scott A. Smith
(74) *Attorney, Agent, or Firm*—St. Onge Steward Johnston & Reens LLC

(57) ABSTRACT

A power screwdriver is disclosed having a drive which is coupled via a clutch, disengaging as a function of torque, to a tool drive shaft for driving a tool. The screwdriver comprises an electronic control unit for controlling the drive, and a sensor which is coupled to the electronic control unit in order to switch off the drive when the clutch responds. The electronic control unit is designed for activating the drive with a certain output, preferably with a reduced output, for a limited time after switch-off.

19 Claims, 2 Drawing Sheets

POWER SCREWDRIVER

This application claims priority from pending German Patent Application No. 10 2004 038 829.6 filed on Aug. 4, 2004.

BACKGROUND OF THE INVENTION

The invention relates to a power screwdriver having a drive which is coupled via a clutch, releasing as a function of torque, to a tool drive shaft for driving a tool, having an electronic control unit for controlling the drive, and having a sensor which is coupled to the electronic control unit in order to switch off the drive when the clutch releases.

Such screwdrivers have been known for quite some time and are used in particular in order to tighten screwed connections with a precise torque. A typical application is found in assembly in the automobile industry when numerous screwed connections are to be tightened as precisely as possible.

Even though the known screwdrivers are sufficient for most applications, demands are nonetheless often made by the users for even more precise adherence to the tightening torque of a screwed connection. Furthermore, it is to be taken into account in this case that, depending on the respective starting parameters, tightening torques may occur which possibly deviate from a predetermined desired value to a more or less great extent even at the same settings.

SUMMARY OF THE INVENTION

In view of this it is a first object of the invention to disclose an improved screwdriver that provides a precise tightening torque.

It is a second object of the invention to disclose an improved screwdriver that is highly reliable.

It is a third object of the invention to disclose a method of controlling a screwdriver so as to allow a precise tightening torque.

It is a forth object of the invention to disclose a method of controlling a screwdriver that is highly reliable.

These and other objects are achieved by a screwdriver wherein an electronic control unit is configured for activating the drive with a certain output, preferably with a reduced output, for a limited time after release of the clutch.

Furthermore, according to the method of the invention, this object is achieved by a method of controlling a screwdriver for tightening a screwed connection with a certain tightening torque, comprising the following steps:

providing a clutch, releasable as a function of torque, in the drive line between a drive and a tool drive shaft for driving a tool;
driving the tool drive shaft via the clutch;
monitoring the clutch for release;
switching off the drive when clutch is releases;
switching on the drive for the subsequent turning of the clutch, and
switching off the drive according to a predetermined switch-off criterion.

The object of the invention is completely achieved in this way.

It has been found that more precise tightening of screwed connections can be achieved if the drive is switched on again with a lower output for a limited time after release of the clutch. This achieves the effect that the clutch comes to a stop at a defined location. In this way, influences which are due to different screwdriving conditions, for example different friction conditions, can be eliminated. In particular, differences between a "soft" screwdriving case, in which the tightening torque is gradually achieved, and a "hard" screwdriving case, in which the tightening torque increases rapidly at the end of the screwdriving, can be compensated for.

In this case, completion of the subsequent turning operation in good time should expediently ensure that the clutch part disengaged when the clutch is disconnected does not strike the other clutch part due to the subsequent turning operation.

In principle, this can be ensured in two ways. On the one hand, the drive can be switched on and switched off again in a time-controlled manner after release of the clutch. On the other hand, the drive can be switched on and switched off again as a function of angle after release of the clutch.

According to a first variant, the electronic control unit, in an advantageous development of the invention, therefore comprises a timer for switching on the drive and switching it off again in a time-controlled manner after release of the clutch.

According to a further advantageous variant of the invention, the screwdriver comprises an angle sensor for detecting the rotation angle of the tool drive shaft, this angle sensor being coupled to the electronic control unit in order to switch on the drive and switch it off again as a function of angle after release of the clutch.

Although switching-on and switching-off the drive of in a time-controlled manner works satisfactorily in principle, the angle-controlled switching-on and switching-off of the drive is preferred, since an even more precise control can be achieved thereby.

According to a further configuration of the invention, the electronic control unit has means for braking the drive after release of the clutch.

In this way, the total time for producing a screwed connection is shortened and a more precise tightening torque is ensured overall.

In an advantageous development of the invention, the drive comprises a motor and a gear unit driven by it. In this case, the angle sensor may be designed as an angle counter which is directly coupled to the motor shaft.

In an alternative embodiment, the angle sensor may in this case be designed as an angle counter which is coupled to an output of the gear unit or to the tool drive shaft.

Both variants are sufficient in order to ensure extremely precise determination of the switch-on and switch-off conditions for the motor.

In a further preferred configuration of the invention, the clutch is designed as a disconnect-type clutch having an adjustable disengaging torque.

In this way, the screwdriver can be set to various tightening torques for different screwdriving cases.

In a further preferred configuration of the invention, the disconnect-type clutch comprises a dog ring which is driven by the gear unit and is coupled via first rolling elements to a control ring, the control ring being elastically preloaded against the dog ring.

In this way, due to the rolling elements, reliable transmission of force via the clutch is made possible and at the same time wear caused by friction is countered.

According to a further configuration of the invention, the control ring is coupled to the tool drive shaft in a rotationally locked but axially displaceable manner via second rolling elements, the rolling elements being guided in axial guides of the control ring and of the tool drive shaft.

In this way, reliable torque transmission from the driven control ring to the tool drive shaft is made possible, and at the same time there is the requisite displaceability of the control ring in the axial direction and there is certain play which enables the effects of tilting forces, caused for instance by differences in tolerance, to be compensated for. The control ring is thus mounted in a floating manner on the tool drive shaft indirectly via the rolling elements but is at the same time axially displaceable.

According to a further configuration of the invention, the dog ring is rotatably mounted on a housing by means of a bearing, in particular by means of a needle bearing, and is supported in the axial direction on one end of the tool drive shaft via third rolling elements.

In this way, friction forces during a disengaging movement of the clutch are largely avoided.

It goes without saying that the abovementioned features and the features still to be explained below can be used not only in the respectively specified combination but also in other combinations or on their own without departing from the scope of the present invention.

BRIEF DESCRIPTION OF THE DRAWINGS

Further features and advantages of the invention follow from the description below of preferred exemplary embodiments with reference to the drawings, in which.

DETAILED DESCRIPTION OF THE PREFERRED EMBODIMENTS

Figure 1:
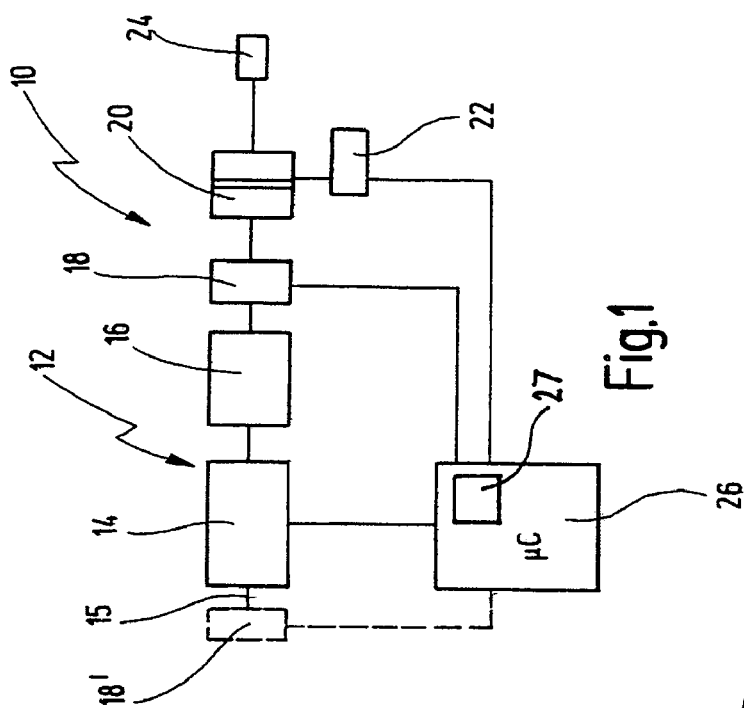
FIG. 1 shows a schematic illustration of a screwdriver according to the invention as a block diagram.

A screwdriver according to the invention is shown in an extremely schematic manner and designated overall by the numeral 10 in FIG. 1.

The screwdriver 10 has a drive 12 which is formed by a motor 14 in the form of a DC motor and a gear unit 16 driven by it. An angle sensor in the form of an angle counter 18 is arranged at the output of the gear unit 16. Furthermore, the gear unit 16 drives a clutch 20 which is designed as a disconnect-type clutch consisting of two halves and whose output is coupled to a tool drive shaft in order to drive a tool 24. A sensor 22 serves to monitor the disengagement of the clutch. A central, microprocessor-controlled electronic control unit 26 is provided for controlling the screwdriver 10. The electronic control unit 26 controls all the operations of the screwdriver 10. The electronic control unit also comprises means for electrically braking the drive which are generally known in the art, merely generally indicated by reference numeral 27 in FIG. 1. Electric braking is well known in the art, see U.S. Pat. No. 6,353,297 to Meyer and U.S. patent application US 2004/0130282 A1 to Meyer et al. which are both fully incorporated by reference.

The angle sensor 18 could also be coupled directly to the motor drive shaft 15 of the motor 14, as indicated by the illustration 18' in broken lines in FIG. 1.

Figure 2:
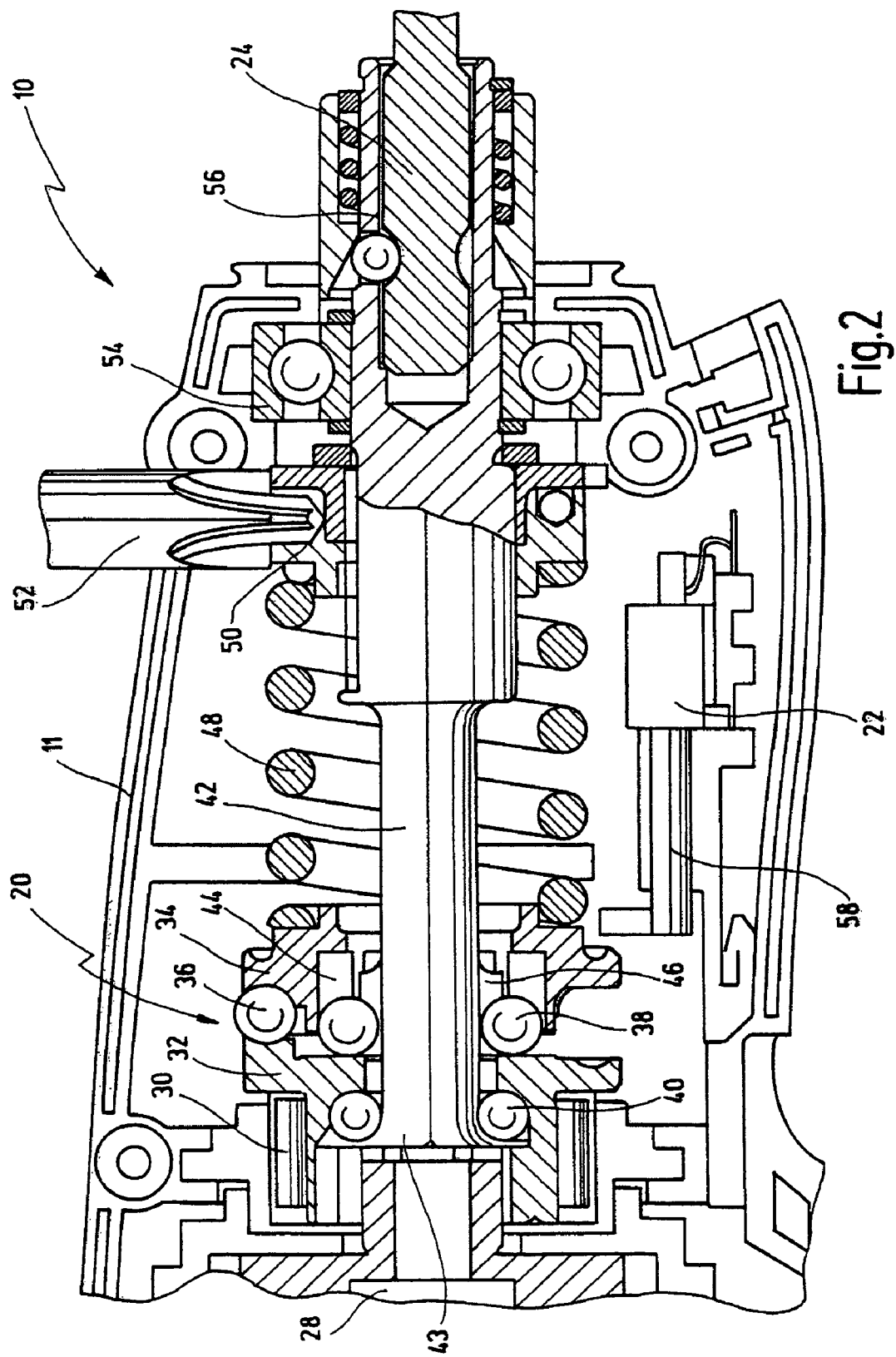
FIG. 2 shows a longitudinal section through a screwdriver according to the invention in the region of its coupling to a tool drive shaft.

The construction of the screwdriver 10 can be seen in more detail from the enlarged illustration according to FIG. 2. The screwdriver 10 has a gear unit 16 (not shown in any more detail), the output 28 of which is connected to the clutch 20.

The clutch 20 has a first clutch half in the form of a dog ring 32 and a second clutch half in the form of a control ring 34, between which first rolling elements 36 in the form of balls are held. The dog ring 32 is mounted on the outside on the housing by means of a needle bearing 30 and is connected to the output 28 of the gear unit 16 in a rotationally locked manner. The dog ring 32 is supported in the axial direction on rolling elements 40 in the form of balls on one end of the tool drive shaft 42. In this way, an axial force transmitted to the dog ring 32 by the control ring 34 via the balls 36 is absorbed.

The driving torque is transmitted by the dog ring 32 via the balls 36 to the control ring 34, which is connected to the tool drive shaft 42 in a rotationally locked manner. The control ring 34 is axially movable relative to the dog ring 32. Serving for the rotationally locked connection to the tool drive part 42 are second rolling elements 38 in the form of balls, which are guided in associated axial guides 44 and 46 of the control ring and of the tool drive shaft 42. The control ring 34 is thus connected to the tool drive shaft 42 in a rotationally locked manner but is axially movable by a certain amount relative to the dog ring 32. The control ring 34 is preloaded against the dog ring 32 by a spring 48 in the form of a helical spring. The spring 48 is held between the control ring 34 and an adjusting ring 50 on the opposite side. The preloading force of the spring 48 can be set by means of the adjusting ring 50 via an adjusting element 52 in order to be able to set the disengaging torque of the clutch 20.

At its end pointing outwards, the tool drive shaft 42 is mounted on the housing 11 by a ball bearing 54 and has a tool receptacle 56, into which a tool 24 can be inserted and fixed in a rotationally locked known manner.

The clutch 20 has a total of three rolling elements or balls 36, which are held at uniform angular distances of 120 degrees between assigned, oblique guide surfaces of the dog ring 32 and the control ring 34. If the disengaging torque, predetermined by the spring 48, of the clutch 20 is exceeded, the rolling elements or balls 36 move along the oblique guide surfaces of the control ring 34. As a result, the control ring 34 is displaced axially outwards by the rolling elements or balls 36.

The disengaging movement of the control ring 34 is monitored by the sensor 22. The sensor 22, which in principle may be constructed in any desired manner, for example as an inductive sensor, is designed in the present case simply as a mechanical switch which opens a switch contact upon actuation. The sensor 22 has an operating rod 58, which is actuated by the axial displacement of the control ring 34 when the clutch 20 is disengaged.

The functioning of the screwdriver according to the invention will now be explained in more detail with reference to FIG. 3.

Figure 3:
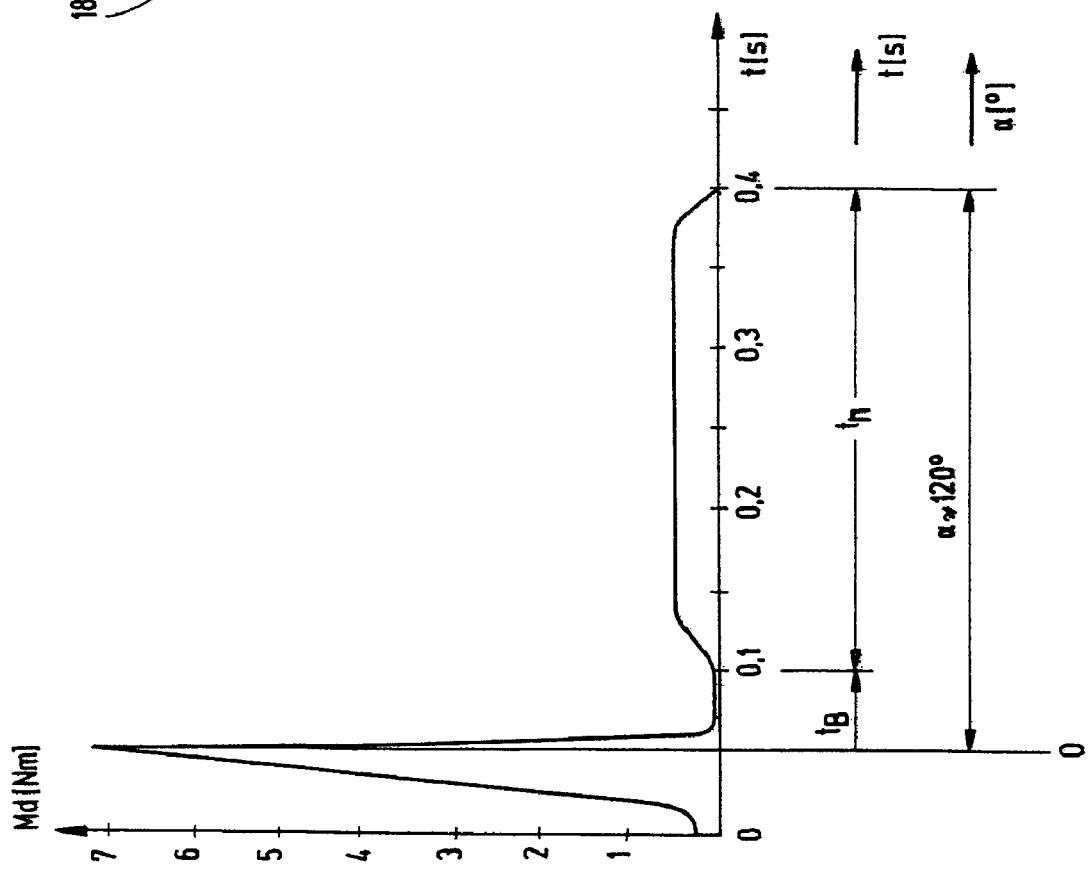
FIG. 3 shows an illustration of the torque characteristic plotted against time and rotation angle.

The torque Md (in Nm) which is transmitted to the tool 24 during a screwdriving operation is plotted on the ordinate of FIG. 3. The associated time t (in seconds) is specified on the abscissa.

At the start of a screwdriving operation, the torque Md is relatively low to begin with. However, the tightened screw runs against a resistance towards the end of the screwdriving operation, and the torque Md increases rapidly up to the maximum value, which in the present case is about 7 Nm. With the increase in the torque, the clutch 20 also disengages, which is detected by the sensor 22. This instant at which the clutch disengages is specified as zero on the time axis. The motor is then braked via the electronic control unit, the braking, in the example shown, lasting for a braking time $t_B$ of about 0.1 seconds. After completion of the braking operation, the motor is again activated with a low voltage in order to transmit a relatively low subsequent torque to the screwed connection for a certain period. As a result, the dog ring 32 comes to a stop in a defined position just before running against the control ring 34.

This is shown in FIG. 3 by a subsequent turning time $t_n$ of about 0.2 seconds, during which an increase in the torque up to about 0.5 Nm is first of all obtained, which remains constant up to the completion of the subsequent turning operation and then drops to zero when the motor is switched off again at the end of the subsequent turning time.

It has been found that a predetermined tightening torque can be maintained especially precisely by such a subsequent turning operation after completion of the braking.

In the exemplary embodiment shown, the clutch 20 has a total of three rolling elements or balls 36 which, offset from one another by 120 degrees, are guided on oblique guide surfaces or dog surfaces of the control ring 34.

In order to avoid a subsequent increase in the torque again by the balls 36 striking the dogs again, offset by 120°, in the subsequent turning phase after the disengaging operation, it is necessary to switch off the motor again in good time.

Since the times can differ slightly depending on the screwdriving operation, it is preferred according to the invention to use angle-controlled switching-off of the motor instead of time-controlled switching-off possible in principle. For this reason, an angle sensor 18 or 18' is provided according to FIG. 1, by means of which the rotations of the dog ring 32 or of the motor shaft are detected starting from the moment at which the clutch is disengaged. Thus the switch-on moment and the switch-off moment of the drive can be exactly determined in an angle-controlled manner upon completion of the subsequent turning.

What is claimed is:

1. A power screwdriver comprising:
 a drive;
 a tool drive shaft for driving a tool;
 a clutch, releasing when a certain preset torque is reached, having an input side being coupled to said drive and having an output side being coupled to said tool drive shaft;
 a sensor being coupled to said clutch for sensing a release of said clutch;
 an angle sensor for sensing a rotation angle of said tool drive shaft; brake means for braking said drive after release of said clutch; and
 an electronic control for controlling said drive, said electronic control being coupled to said sensor for deactivating said drive when said clutch releases, and wherein said electronic control is coupled to said angle sensor for switching on said drive again upon reaching a first rotation angle after release of said clutch and for switching off said drive again upon reaching a second rotation angle after release of said clutch.

2. The screwdriver of claim 1, wherein said clutch is configured as a disconnect-type clutch having an adjustable disengaging torque.

3. The screwdriver of claim 2, wherein said clutch comprises a dog ring which is driven by said gear and is coupled via first rolling elements to a control ring, said control ring being elastically biased against said dog ring.

4. A power screwdriver comprising:
 a drive;
 a tool drive shaft for driving a tool;
 a clutch, releasing when a certain preset torque is reached, having an input side being coupled to said drive and having an output side being coupled to said tool drive shaft;
 a sensor being coupled to said clutch for sensing a release of said clutch;
 and an electronic control for controlling said drive, said electronic control being coupled to said sensor for deactivating said drive when said clutch releases, wherein said electronic control is configured for reactivating said drive with a certain output for a limited time after deactivation of said drive.

5. The screwdriver of claim 4, wherein said electronic control is configured for reactivating said drive with a reduced output for a limited time after deactivation of said drive.

6. The screwdriver of claim 4, wherein said electronic control unit comprises a timer for switching on said drive after release of said clutch and for switching off said drive again in a time-controlled manner.

7. The screwdriver of claim 4, further comprising an angle sensor for detecting a rotation angle of said tool drive shaft, said angle sensor being coupled to the electronic control unit for switching on said drive upon reaching a first rotation angle and for switching it off again upon reaching a second rotation angle after release of said clutch.

8. The screwdriver of claim 4, wherein said electronic control unit is comprises means for electrically braking said drive after release of said clutch.

9. The screwdriver of claim 4, wherein said drive comprises a motor having a motor shaft and a gear driven by said motor, said angle sensor being configured as an angle counter which is coupled to said motor shaft.

10. The screwdriver of claim 4, wherein said drive comprises a motor having a motor shaft and a gear driven by said motor, said angle sensor being configured as an angle counter which is coupled to said tool drive shaft.

11. The screwdriver of claim 4, wherein said drive comprises a motor having a motor shaft and a gear driven by said motor, said angle sensor being configured as an angle counter which is coupled to an output side of said gear.

12. The screwdriver of claim 4, wherein said clutch is configured as a disconnect-type clutch having an adjustable disengaging torque.

13. The screwdriver of claim 12, wherein said clutch comprises a dog ring which is driven by said gear and is coupled via first rolling elements to a control ring, said control ring being elastically biased against said dog ring.

14. The screwdriver of claim 13, wherein said control ring comprises axial guides within which second rolling elements are guided, said second rolling elements engaging axial guides provided within said tool drive shaft, thereby connecting said control ring to said tool drive shaft in a rotationally locked but axially displaceable manner.

15. The screwdriver of claim 14, further comprising a housing, within which a bearing is held for supporting said dog ring rotatably, and further comprising third rolling elements resting against one end of said tool drive shaft for supporting said dog ring in axial direction.

16. A method of controlling a power screwdriver for tightening a screw connection with a certain tightening torque, comprising the following steps:
 providing a clutch between a drive and a tool drive shaft for driving a tool, said clutch being releasable as a function of torque;
 driving said tool drive shaft via said clutch;
 monitoring said clutch for release;
 switching off said drive when said clutch releases;
 braking said drive;

switching on said drive again for subsequently driving said clutch for a limited time period; and switching off said drive again according to a predetermined switch-off criterion.

17. The method of claim 16, wherein said drive after release of said clutch is driven with an output reduced compared with a rated output of said drive.

18. The method of claim 17, wherein said drive is switched on again after a certain period has elapsed after release of said clutch and wherein said drive is switched off again after a further period has elapsed.

19. The method of claim 17, wherein said drive is switched on after reaching a first rotation angle is reached starting from release of said clutch and is switched off again after reaching a second rotation angle starting from release of said clutch.

* * * * *